(12) United States Patent
Kikuchi

(10) Patent No.: US 12,035,022 B2
(45) Date of Patent: Jul. 9, 2024

(54) INFORMATION INPUT DEVICE ALLOWING TILT OPERATION OF MULTI-DIRECTIONAL INPUT

(71) Applicant: CANON KABUSHIKI KAISHA, Tokyo (JP)

(72) Inventor: Yusuke Kikuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 17/166,541

(22) Filed: Feb. 3, 2021

(65) Prior Publication Data
US 2021/0250471 A1 Aug. 12, 2021

(30) Foreign Application Priority Data
Feb. 7, 2020 (JP) .................................. 2020-019729

(51) Int. Cl.
| | | |
|---|---|---|
| *H04N 23/50* | (2023.01) | |
| *G01B 7/30* | (2006.01) | |
| *H04N 23/69* | (2023.01) | |

(52) U.S. Cl.
CPC ............... *H04N 23/50* (2023.01); *G01B 7/30* (2013.01); *H04N 23/69* (2023.01)

(58) Field of Classification Search
CPC ........ G03B 17/02; G03B 13/36; G03B 17/14; H01H 2025/045; H01H 25/04; H01H 25/041; H04N 23/51; H04N 23/50; H04N 23/69; G01B 7/30; G06F 3/0304; G06F 3/0312; G06F 3/0362; F01N 2330/10; F01N 3/0211; F01N 3/0226; F01N 3/0253; A63F 13/2145; A63F 13/52; A63F 13/537; B29C 48/08; B29C 48/914; B29C 48/915

See application file for complete search history.

(56) References Cited

U.S. PATENT DOCUMENTS

| | | | |
|---|---|---|---|
| 6,552,713 B1 | 4/2003 | Van Brocklin et al. | |
| 10,841,463 B2 * | 11/2020 | Saiki | G03B 17/02 |
| 11,004,631 B2 * | 5/2021 | Ito | H01H 3/02 |
| 11,270,862 B2 * | 3/2022 | Hirayama | H01H 36/004 |
| 11,281,074 B2 * | 3/2022 | Nakamura | G03B 17/02 |
| 11,605,513 B2 * | 3/2023 | Suzuki | H01H 25/04 |
| 2017/0126942 A1 * | 5/2017 | Yamamoto | H01H 25/041 |
| 2017/0213670 A1 * | 7/2017 | Okano | G05G 25/04 |

(Continued)

FOREIGN PATENT DOCUMENTS

| | | |
|---|---|---|
| EP | 2458608 A1 | 5/2012 |
| JP | H11345076 A | 12/1999 |
| JP | 2013251160 A | 12/2013 |

(Continued)

*Primary Examiner* — Antoinette T Spinks
(74) *Attorney, Agent, or Firm* — Canon U.S.A., Inc. IP Division

(57) ABSTRACT

The present disclosure provides an information input device in a miniaturized size allowing both rotation operation and tilt operation. In the information input device, viewed from the direction orthogonal to the rotation axis of a rotation operation member, the rotation operation member includes a second sloping surface extending from the end of a first sloping surface nearer a rotation detection unit and approaching the rotation axis of the rotation operation member as the second sloping surface extends from the rotation detection unit in the rotation axis direction.

6 Claims, 8 Drawing Sheets

(56) References Cited

U.S. PATENT DOCUMENTS

2021/0249206 A1\* 8/2021 Suzuki .................. H01H 25/041
2023/0059185 A1\* 2/2023 Nakashima .......... H03K 17/965

FOREIGN PATENT DOCUMENTS

| JP | 2017091613 A | 5/2017 |
| JP | 2017134899 A | 8/2017 |
| JP | 2020019728 A | 2/2020 |

\* cited by examiner

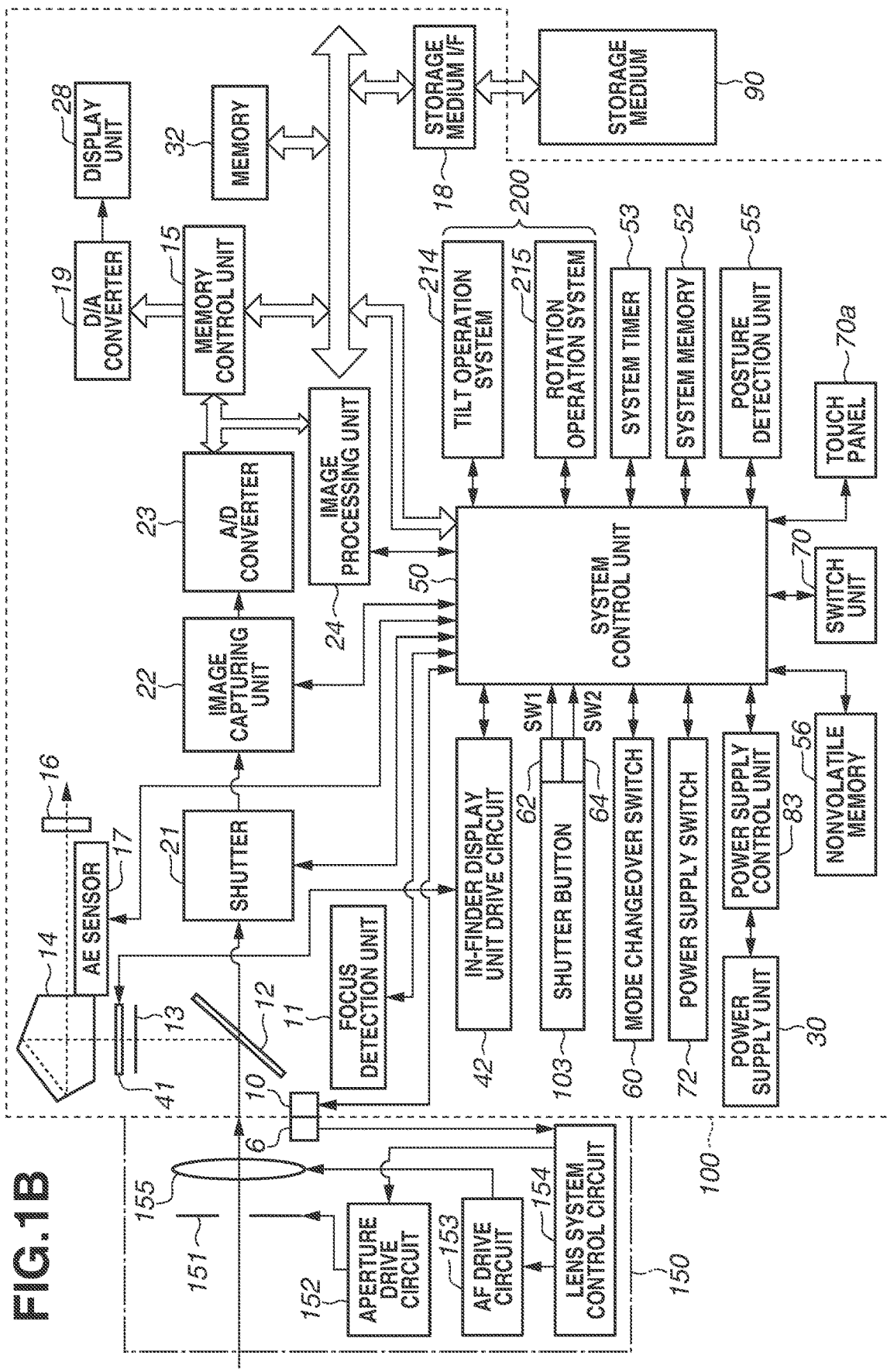

INFORMATION INPUT DEVICE ALLOWING TILT OPERATION OF MULTI-DIRECTIONAL INPUT

BACKGROUND

Field of the Disclosure

The present disclosure generally relates to input devices mounted on image capturing devices such as cameras and video camcorders to input various pieces of information, and more specifically, relates to an information input device that allows tilt operation of multi-directional input.

Description of the Related Art

Electronic devices such as cameras and video camcorders include various operation members.

For example, some electronic devices may be equipped with a rotary dial that is rotatably operated and a tilt switch that can be tilted in multiple directions, as operation members to select various setting items in capture of still images or moving images.

An information input device related to the technique is discussed in Japanese Patent Application Laid-Open No. 2013-251160.

FIG. 7 is an external view of an electronic device 700 provided with an information input device 701 according to Japanese Patent Application Laid-Open No. 2013-251160.

The information input device 701 consists of two types of operation members: a rotation operation member 702 and a tilt operation member 703.

In the information input device 701 according to Japanese Patent Application Laid-Open No. 2013-251160, the rotation operation member 702 is formed in an annular shape. The tilt operation member 703, which is in the center of the rotation operation member 702, is formed in a circular shape, and allows information to be input by being tilted.

This configuration allows the information input device 701, which receives these two types of information input, to be disposed in a size sufficient to be operated with a single right thumb, in the electronic device 700.

In a recent trend toward smaller electronic devices above such as cameras and video camcorders, these operation members mounted on an electronic device have been smaller with the conventional rotation operation and tilt operation kept available.

However, by the conventional technique discussed in Japanese Patent Application Laid-Open No. 2013-251160, it can be difficult to achieve two points: both the rotation operation and the tilt operation, and miniaturization. The reason will be described with reference to FIG. 7.

A display device 704 such as a liquid crystal display (LCD) is used in setting of various functions and parameters of the electronic device 700, playback of images, and display of information.

The display device 704 occupies a size sufficient for visibility.

Miniaturization of the electronic device 700, particularly, in the X direction, therefore makes the area S available to dispose various operation members indicated by an alternate long and short dash line narrower, thereby operation members to select various functions and parameter settings in capture of images being miniaturized.

As the information input device 701 is miniaturized, the operation surface of the tilt operation member 703 becomes smaller, making it easier for a user's finger to inadvertently come into contact with the rotation operation member 702 in tilt operation of the tilt operation member 703.

Thus, using the configuration of the information input device 701 discussed in Japanese Patent Application Laid-Open No. 2013-251160 involves difficulties in achieving both the rotation operation and the tilt operation and miniaturization.

SUMMARY

According to an aspect of the present disclosure, an information input device includes a rotation operation member configured to be rotatably operated, the rotation operation member being in an annular shape, an operation member having an operation surface in a plane orthogonal to a rotation axis of the rotation operation member, a detection unit configured to detect an operation on the operation member, and a rotation detection unit configured to detect a rotation operation around the rotation axis of the rotation operation member. The operation member extends in a rotation axis direction of the rotation operation member. The operation surface of the operation member is disposed inside an annular rotation operation surface of the rotation operation member. Viewed from a direction orthogonal to the rotation axis of the rotation operation member, the rotation operation member includes a first sloping surface sloping with respect to the rotation axis of the rotation operation member and being on an annular inner circumference side of the rotation operation member, the first sloping surface being opposite to the operation member. Viewed from the direction orthogonal to the rotation axis of the rotation operation member, the first sloping surface extends from the rotation axis of the rotation operation member, as the first sloping surface extends from the rotation detection unit in the rotation axis direction. Viewed from the direction orthogonal to the rotation axis of the rotation operation member, the rotation operation member includes a second sloping surface extending from an end of the first sloping surface nearer the rotation detection unit and approaching the rotation axis of the rotation operation member as the second sloping surface extends from the rotation detection unit in the rotation axis direction. Viewed from the direction orthogonal to the rotation axis of the rotation operation member, an inner end of the second sloping surface nearer the operation surface is located nearer the rotation axis than an outer edge of the operation member in a radial direction. Viewed from the direction orthogonal to the rotation axis of the rotation operation member, the end of the second sloping surface nearer the operation surface is lower than an end of the first sloping surface nearer the operation surface and the operation surface of the operation member, and is higher than an end of the operation member nearer the rotation detection unit in the rotation axis direction.

According to the present disclosure, an information input device is provided in a miniaturized size that receives both the rotation operation and the tilt operation.

Further features of the present disclosure will become apparent from the following description of exemplary embodiments with reference to the attached drawings.

BRIEF DESCRIPTION OF THE DRAWINGS

FIG. 1B is a configuration diagram illustrating the electronic device provided with the information input device according to the first exemplary embodiment of the present disclosure.

DESCRIPTION OF THE EMBODIMENTS

Various exemplary embodiments of the present disclosure will be described in detail below with reference to the attached drawings.

A first exemplary embodiment of the present disclosure is described with reference to FIGS. 1A and 1B to FIGS. 3A and 3B.

(External View of Digital Camera)

Figure 1A:
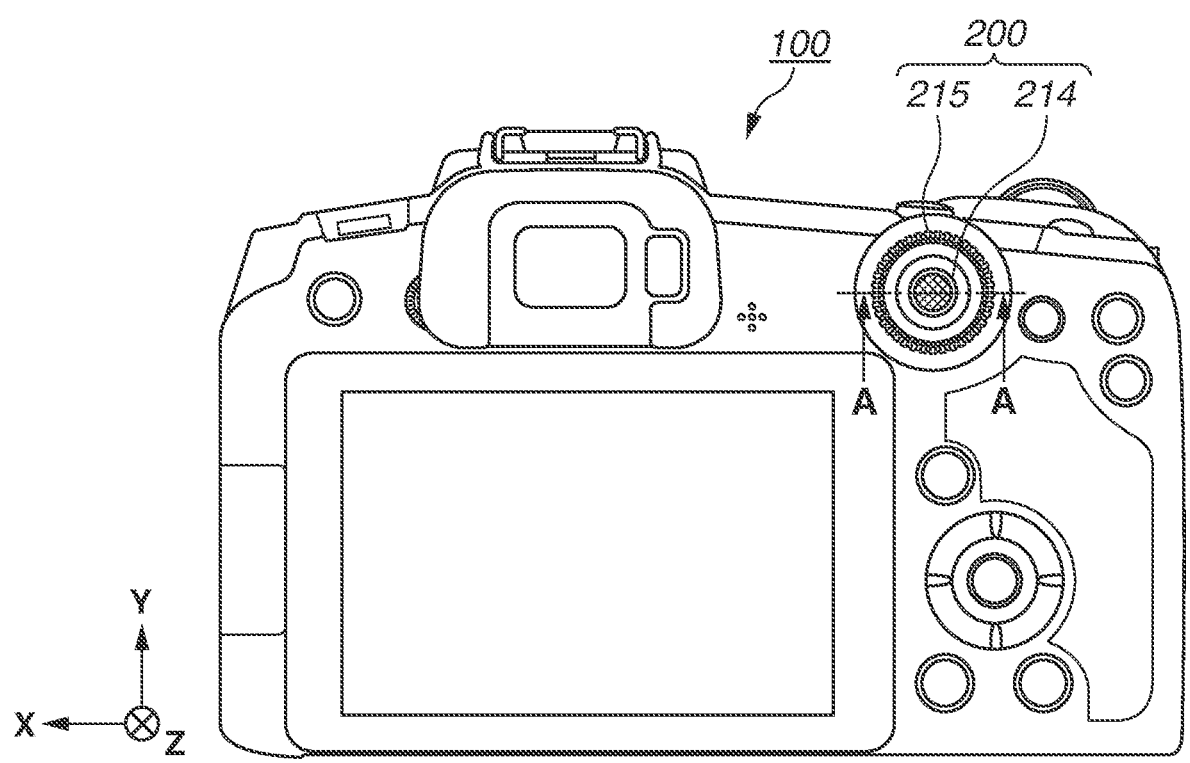
FIG. 1A is an external view of an electronic device provided with an information input device according to a first exemplary embodiment of the present disclosure.

FIG. 1A is an external view of an electronic device provided with an information input device 200 according to the first exemplary embodiment of the present disclosure.

The electronic device according to the present disclosure is a digital camera as an example, and, hereinafter, the electronic device is referred to as a camera 100.

FIG. 1A illustrates the camera 100 in the rear view.

The information input device 200 according to the present exemplary embodiment includes a rotation operation system 215 and a tilt operation system 214.

The rotation operation system 215 and the tilt operation system 214 are used to set various functions and parameters of the camera 100.

(Block Diagram)

FIG. 1B is a block diagram illustrating a configuration of the camera 100 and a lens unit 150.

The lens unit 150 includes an interchangeable image capturing lens.

In FIG. 1B, one lens 155 is illustrated, but a plurality of lenses 155 may be included.

A communication terminal 6 is provided to allow the lens unit 150 to communicate with the camera 100.

A communication terminal 10 is provided to allow the camera 100 to communicate with the lens unit 150.

The lens unit 150 communicates with a system control unit 50 via the communication terminals 6 and 10.

A lens system control circuit 154 controls an aperture 151 via an aperture drive circuit 152 and focuses the lens 155 by changing the position of the lens 155 via an automatic focus (AF) drive circuit 153.

Next, the internal configuration of the camera 100 is described.

In FIG. 1B, a display unit 28 is a rear monitor to display images and various settings of the camera 100.

The display unit 28 is a display such as a liquid crystal display or an organic electroluminescent (EL) display.

A user can transmit an image displayed on the display unit 28 and also change various settings of the camera 100 by operating the rotation operation system 215 and the tilt operation system 214.

The display unit 28 is integrally configured with a touch panel 70a, which can detect a touch operation.

The touch panel 70a may be selected from among various types of touch panels including a resistance film type, a capacitance type, a surface acoustic wave type, an infrared type, an electromagnetic induction type, an image recognition type, and an optical sensor type.

There are a method of detecting a touch upon the contact on a touch panel and a method of detecting a touch upon the approach of a finger or a pen to the touch panel, and either method may be applied.

A viewfinder 16 is a look-in type eyepiece viewfinder to check optical image focuses and compositions of of an object obtained through the lens unit 150.

The user observes an image formed on a focusing screen 13 via a pentaprism 14 and the viewfinder 16 to check the focus condition and the composition of the optical image of the object obtained through the lens unit 150.

The viewfinder may be an electronic viewfinder (EVF) to display image signals obtained by an image capturing unit 22.

In this case, the focusing screen 13 and the pentaprism 14 can be omitted.

An in-finder display unit drive circuit 42 drives an in-finder display unit 41 in the viewfinder 16 with the system control unit 50 connected thereto.

An automatic exposure (AE) sensor 17 measures the brightness of the image of the object formed on the focusing screen 13 via the lens unit 150 and a quick-return mirror (a mirror 12).

A focus detection unit 11 is a phase difference detection type autofocusing sensor to capture an image incident via the mirror 12 and output information indicating a defocus amount to the system control unit 50.

Autofocus may be referred to as "AF" below.

The system control unit 50 controls the lens unit 150 based on the information indicating the defocus amount to perform phase difference AF.

The method of AF may be contrast AF, other than the phase difference AF.

The phase difference AF may be performed based on the defocus amount detected on an imaging plane of the image capturing unit 22 (imaging plane phase difference AF) without using the focus detection unit 11.

The mirror 12 is moved up and down by an actuator, which is not illustrated, based on instructions from the system control unit 50 in exposure, live view image capturing, and moving image capturing.

The mirror 12 switches the travel of the luminous flux incident from the lens 155 to the viewfinder 16 or the image capturing unit 22.

The mirror 12 is positioned to reflect the luminous flux to the viewfinder 16 in the normal state.

Upon an image capturing or live view display, the mirror 12 jumps upward (mirror up) and goes out of the luminous flux in order to guide the luminous flux to the image capturing unit 22.

The mirror 12 is a half mirror so that partial light may pass through the center portion thereof, through which partial luminous flux enters the focus detection unit 11 to perform focus detection.

A focal plane shutter (a shutter 21) is used to control an exposure time of the image capturing unit 22 under the control of the system control unit 50.

The image capturing unit 22 is an image sensor that is a charge coupled device (CCD) sensor or complementary metal oxide semiconductor (CMOS) sensor, which both convert an optical image into electrical signals.

An analog-to-digital (A/D) converter 23 converts analog signals output by the image capturing unit 22 into digital signals.

An image processing unit 24 performs predetermined processing on data output by the A/D converter 23 (digital signal data) or data output by a memory control unit 15.

The predetermined processing includes, for example, pixel interpolation, resizing processing such as reduction, and color conversion processing.

The image processing unit 24 performs predetermined calculation processing using captured image data.

The system control unit 50 performs exposure control and ranging control based on the calculation result.

As above mentioned, through-the-lens (TTL) type AF processing, AE processing, and flash preliminary light emission (EF) processing are performed.

TTL type auto white balance (AWB) processing is performed based on the calculation result obtained by the calculation processing.

A memory 32 stores image data captured by the image capturing unit 22 (digital data converted by the A/D converter 23) and image data to be displayed on the display unit 28.

The memory 32 has a storage capacity sufficient to store a predetermined number of still images and moving images and sound data for a predetermined time length.

The memory 32 may be a detachable storage medium such as a memory card or a built-in memory.

A digital-to-analog (D/A) converter 19 converts image display data stored in the memory 32 from digital signals into analog signals and outputs to the display unit 28.

Through that process, an image is displayed on the display unit 28.

A posture detection unit 55 is a sensor to detect a posture of the camera 100 based on an angle.

A nonvolatile memory 56 is a memory on which the system control unit 50 can erase and record data electrically, and, for example, is an electrically erasable and programmable read only memory (EEPROM).

The nonvolatile memory 56 stores, for example, operational constants of the system control unit 50 and programs to operate the camera 100.

The system control unit 50 incorporates at least one processor and controls the entire camera 100.

The at least one processor in the system control unit 50 runs programs stored in the nonvolatile memory 56 and perform various controls the camera 100.

A constant and a variable for an operation of the system control unit 50 and a program read out from the nonvolatile memory 56 are loaded into a system memory 52.

The system control unit 50 performs display control by controlling the memory 32, the D/A converter 19, and the display unit 28.

A system timer 53 measures the time used in each type of control and the time of a built-in clock.

A mode changeover switch 60 is used to change an operation mode of the system control unit 50 to any one of a plurality of modes (a still image capturing mode, a moving image capturing mode, and other modes).

The still image capturing mode includes a P mode (a program AE) and an M mode (a manual mode).

The configuration may allow the mode changeover switch 60 to once switch to a menu screen and then to switch to one of these modes on the menu screen.

Similarly, the moving image capturing mode may include a plurality of modes.

In the M mode, the user can set an aperture value, a shutter speed, and an International Organization for Standardization (ISO) sensitivity, and capture an image with an exposure setting made by the user.

A shutter button 103 is an instruction unit to instruct image capturing.

A first shutter switch 62 is turned ON in the middle of operation, or half-press (an image capturing preparation instruction) of the shutter button 103 provided on the camera 100, generating a first shutter switch signal SW1.

Upon the generation of the first shutter switch signal SW1, operations such as AF processing, AE processing, AWB processing, and EF processing are started.

In addition, the AE sensor 17 performs photometry.

A second shutter switch 64 is turned ON by completion of the operation, or full-press (an image capturing instruction) of the shutter button 103, generating a second shutter switch signal SW2.

The generation of the second shutter switch signal SW2 starts the system control unit 50 operating a series of image capturing processing from reading a signal from the image capturing unit 22 to writing image data into a storage medium 90.

A power supply switch 72 is an operation member to switch the power supply of the camera 100 between ON and OFF.

A power supply control unit 83 includes a battery detection circuit, a direct current to direct current (DC-DC) converter, and a switch circuit to switch a live block.

The power supply control unit 83 detects whether a battery is installed, a type of the battery, a remaining battery charge.

The power supply control unit 83 also controls the DC-DC converter based on a detection result and an instruction from the system control unit 50 and applies a voltage to each unit including the storage medium 90 for a period.

A power supply unit 30 includes a primary battery such as an alkaline battery and a lithium (Li) battery, or a secondary battery such as a nickel-cadmium (NiCd) battery, a nickel metal hydride (NiMH) battery, and a Li battery, and an alternate current (AC) adapter.

A storage medium interface (I/F) 18 is an interface with the storage medium 90 such as a memory card and a hard disk.

The storage medium 90 includes a memory card to store captured images, such as a semiconductor memory or a magnetic disk.

(Exploded Perspective View Of Information Input Device 200)

Figure 2:
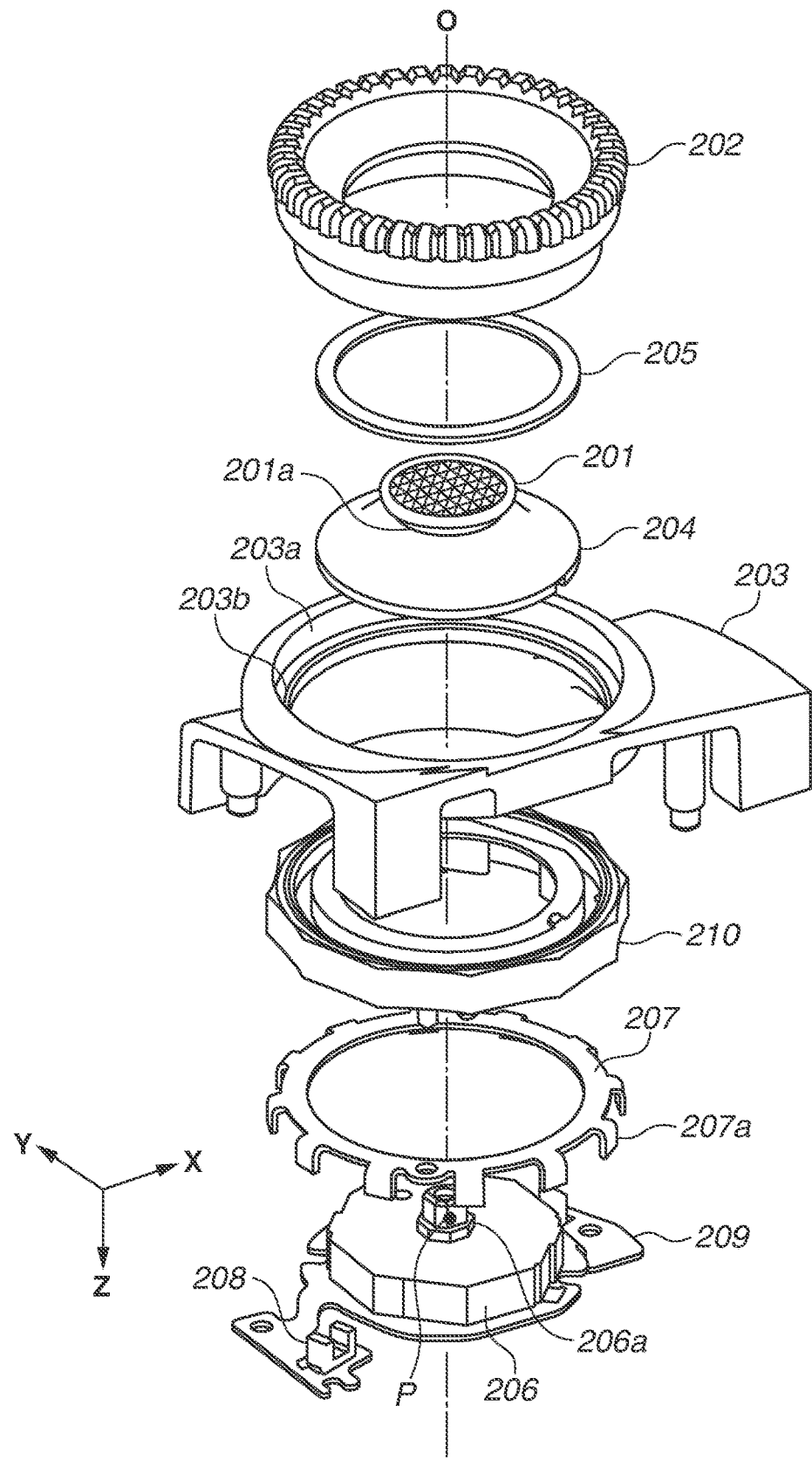
FIG. 2 is an exploded perspective view of the information input device according to the first exemplary embodiment of the present disclosure.

FIG. 2 is an exploded perspective view of the information input device 200 according to the first exemplary embodiment of the present disclosure.

The rotation operation system 215 of the information input device 200 according to the present exemplary embodiment includes a rotary dial 202, a support member 210, a light shielding plate 207, a pair of photointerrupters 208 mounted on a printed wiring board 209.

The rotary dial 202 is formed in an annular shape and is provided on the camera 100 as a rotation operation member.

The support member 210 rotatably supports the rotary dial 202.

The light shielding plate 207 is fixed to the back surface of the support member 210 and rotates in conjunction with the rotary dial 202 and the support member 210.

The printed wiring board 209 is disposed under the rotary dial 202 and is provided with the photointerrupters 208 as a transmissive optical sensor and a movable switch 206.

The light shielding plate 207 includes light shielding walls 207a, which changes the photointerrupters 208 from a non-light shielding state to a light shielding state as the light shielding plate 207 rotates.

The light shielding walls 207a pass through the interior of the photointerrupters 208 and switch the light shielding state and the non-light shielding state, and the photointerrupters 208 can detect rotation of the rotary dial 202.

The method of detecting rotation of the rotary dial 202, for example, employs a conventional technique discussed in Japanese Patent Application Laid-Open No. 2017-91613, and detailed descriptions thereof are omitted.

The tilt operation system 214 of the information input device 200 according to the present exemplary embodiment includes a keytop 201, the movable switch 206 (a tilt detection unit) provided on the printed wiring board 209, a drip-proof member 204, and a sliding member 205.

The keytop 201 is formed in an approximately shaft shape extending in the direction along an axis O as the axis of rotation of the rotary dial 202 and is provided on the camera 100 as an operation member to be tilted.

The keytop 201 is provided inside the rotary dial 202 so that a tilt center P (described in detail below) of the keytop 201 coincides with the axis O as the rotation axis of the rotary dial 202.

The keytop 201 is coupled to a shaft portion 206a of the movable switch 206. A tilt operation of the keytop 201 is available in eight directions for an input to the movable switch 206 mounted on the printed wiring board 209.

The drip-proof member 204 is fitted and held in a hollow portion 201a in a part of the periphery of the keytop 201.

If the keytop 201 is moved, the drip-proof member 204 is moved together, maintaining the fitting.

Further, the drip-proof member 204 is sandwiched between the rotary dial 202 and the support member 210, sealing the inside of the rotary dial 202, preventing water and dust from entering the information input device 200.

The sliding member 205 is attached to the rotary dial 202.

The sliding member 205 reduces friction in rotation of the rotary dial 202 and makes the rotary dial 202 slidable on the drip-proof member 204.

The camera 100 includes an exterior cover 203 whose −Z direction in FIG. 2 faces the outside of the camera 100.

The exterior cover 203 has a projection portion 203b that is sandwiched between the support member 210 and the rotary dial 202, supporting the information input device 200 on a depression portion 203a in the exterior cover 203.

(Cross-Sectional View Of Information Input Device 200)

Figure 3A:
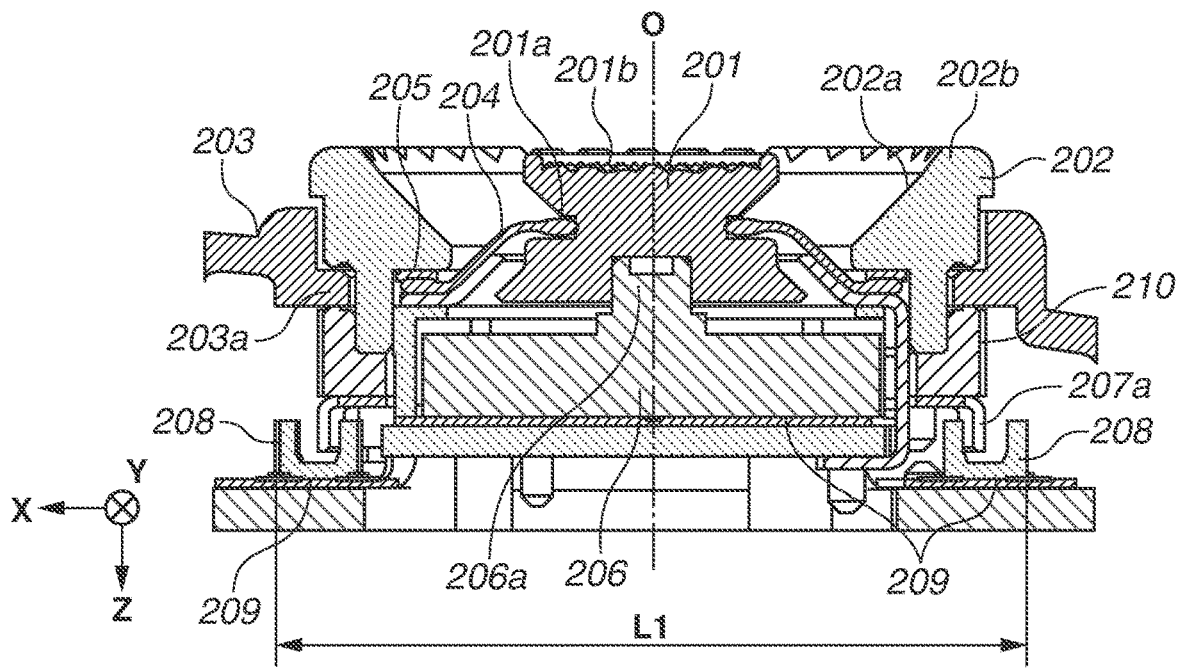
FIG. 3A is a cross-sectional view of the information input device according to the first exemplary embodiment of the present disclosure.
Figure 3B:
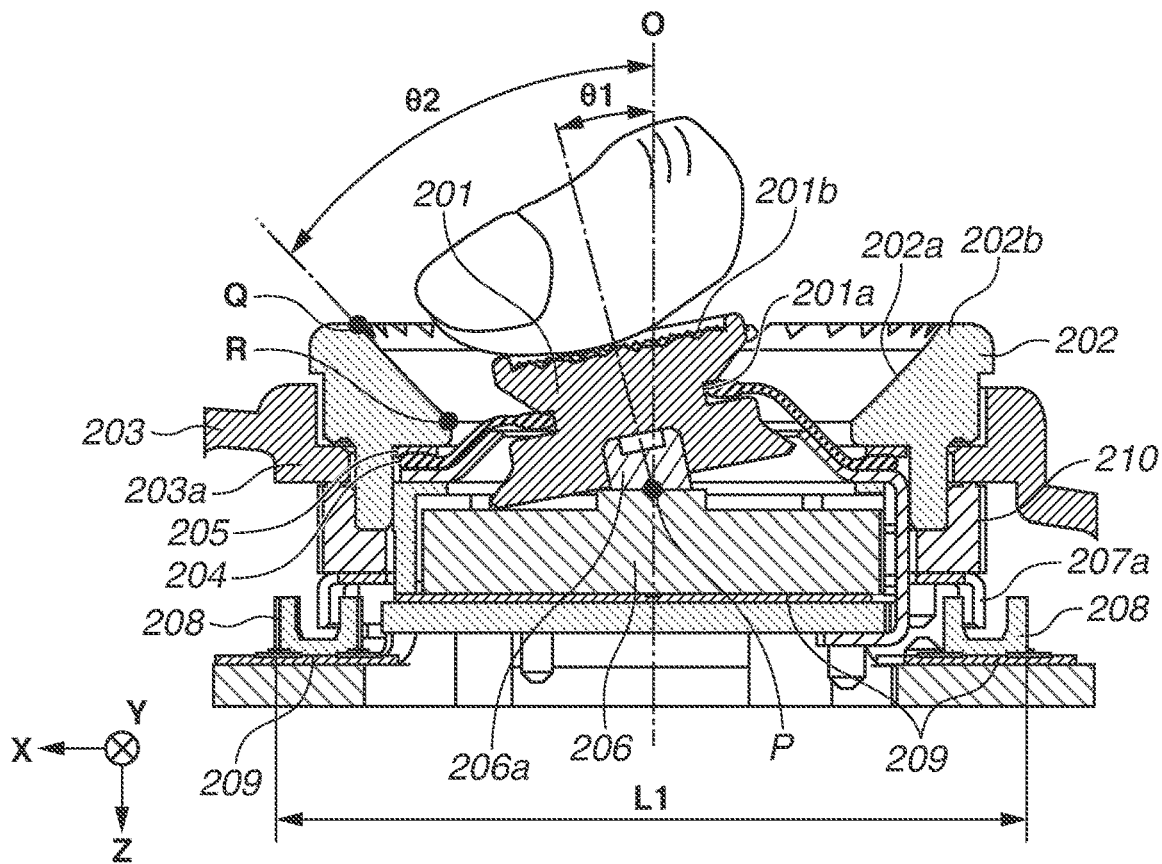
FIG. 3B is a cross-sectional view illustrating a tilt operation performed on the information input device according to the first exemplary embodiment of the present disclosure.

FIGS. 3A and 3B are cross-sectional views along a line A-A of FIG. 1A of the information input device 200 according to the first exemplary embodiment of the present disclosure.

FIG. 3A illustrates the keytop 201, which is not tilted, and FIG. 3B illustrates the keytop 201 tilted in a direction.

In FIG. 3B, the keytop 201 is tilted at a maximum tilt angle of $\theta 1$ in the tiltable range of the movable switch 206.

In order to maintain the operability of both the rotation operation and the tilt operation, a rotation operation surface 202b of the rotary dial 202 and a tilt operation surface 201b of the keytop 201 are substantially flush with each other.

The reason is explained as follows.

With the tilt operation surface 201b higher than the rotation operation surface 202b in the −Z direction, a user's finger is likely to come into contact with the keytop 201 in rotating the rotary dial 202 one round.

As a result, it is highly likely to cause an erroneous operation of inputting an unintentional tilt operation during the rotation operation, which means worse operability of the information input device 200.

On the other hand, with the tilt operation surface 201b lower than the rotation operation surface 202b in the −Z direction, the user's finger is likely to come into contact with the rotary dial 202 because the user puts a finger into the rotary dial 202 for a tilt operation.

As a result, it is highly likely to cause an erroneous operation of inputting an unintentional rotation operation during the tilt operation, which also means worse operability of the information input device 200.

In order to prevent the above-described erroneous operations, both the rotation operation surface 202b and the tilt operation surface 201b are aligned with each other.

For the above-described reasons, the rotation operation surface 202b and the tilt operation surface 201b are substantially flush with each other.

This prevents the above-described unintentional tilt operation and rotation operation.

In addition, FIG. 3B illustrates a first sloping surface 202a with an inclination angle of $\theta 2$ that is formed by a line connecting a point Q and a point R on the inner circumference of the rotary dial 202.

The point Q lies away from the outline of the keytop 201.

This makes a finger of the user to operate both the keytop 201 and the rotary dial 202 or only the keytop 201 unlikely to come into contact with the rotary dial 202 with the keytop 201 tilted by the user.

In other words, this configuration hardly hinders the tilt operation of the keytop 201.

On the other hand, the point R is nearer the outline of the keytop 201.

The point R near to the tilt center P creates a narrow tiltable range of the keytop 201. Besides, the point R is below the tilt operation surface 201b in the Z direction, preventing contact by the user's finger.

This makes it possible to place the point R near the outline of the keytop 201, reducing the inside diameter of the rotary dial 202.

This makes the rotary dial 202 unlikely to occupy within the tiltable range of the keytop 201 and makes it possible for the rotary dial 202 to be miniaturized in the radial direction (in the X direction).

The information input device 200 includes the photointerrupters 208 as a rotation detection unit to detect the rotation of the rotary dial 202 as rotation operation member about the rotation axis.

The keytop 201 as a tilt operation member is supported by the movable switch 206 as the tilt detection unit, which can detect the tilt operation with respect to the rotation axis of the rotary dial 202 as the rotation operation member.

The keytop 201, which is moved by a tilt input action in a plurality of directions in the plane orthogonal to the rotation axis, extends in the rotation axis direction of the rotary dial 202, which can perform the rotation operation and has the annular shape.

The tilt operation surface 201b of the keytop 201 is disposed inside the rotation operation surface 202b in an annular form, of the rotary dial 202.

Viewed from the direction orthogonal to the rotation axis of the rotary dial 202, the rotary dial 202 has the first sloping surface 202a in the inside surface of the rotary dial 202 in an annular form, the first sloping surface 202a being opposite to the keytop 201. The first sloping surface 202a is inclined with respect to the rotation axis of the rotary dial 202.

Viewed from the direction orthogonal to the rotation axis of the rotary dial 202, the first sloping surface 202a grows more distant from the rotation axis of the rotary dial 202 as the first sloping surface 202a grows more distant from the rotation detection unit in the rotation axis direction.

According to the above-described configuration, the information input device 200 according to the present exemplary embodiment provides both the rotation operation and the tilt operation in a miniaturized size.

A second exemplary embodiment is described. A configuration that makes the information input device 200 smaller than the configuration according to the first exemplary embodiment is described with reference to FIG. 4.

(Cross-Sectional View Of Information Input Device 200)

Figure 4:
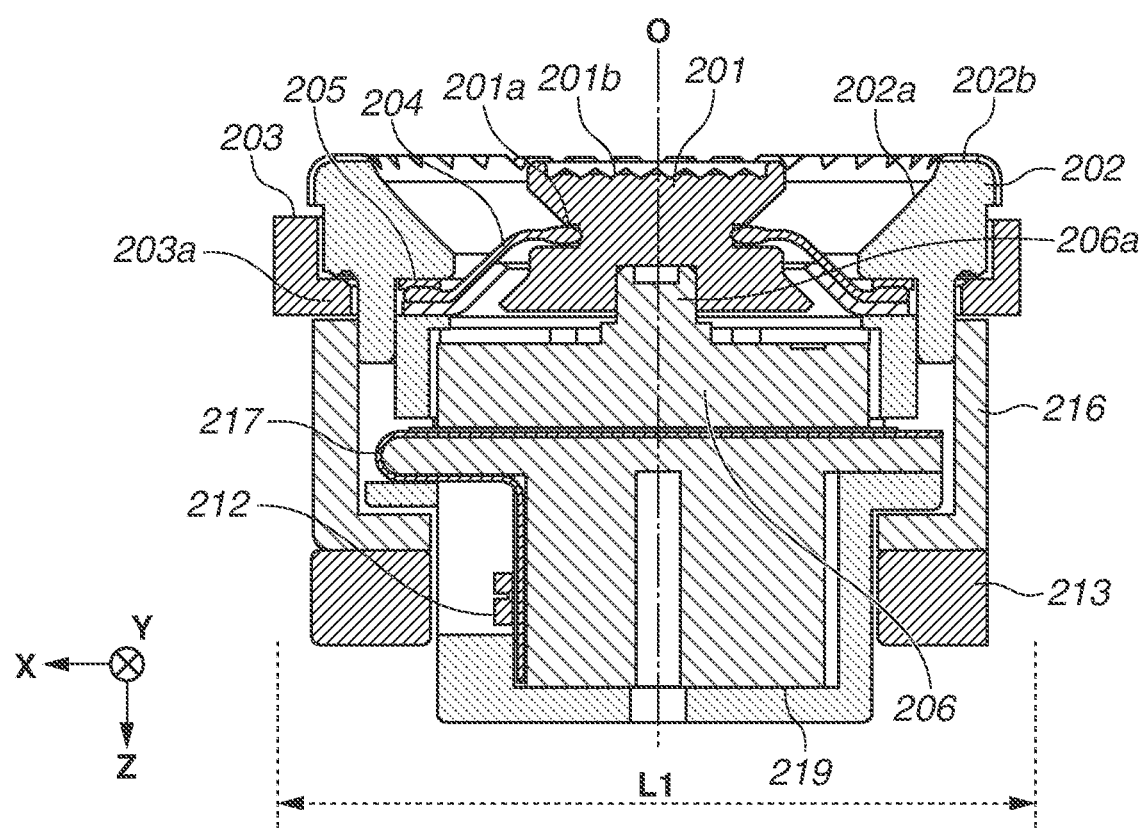
FIG. 4 is a cross-sectional view of an information input device according to a second exemplary embodiment of the present disclosure.

FIG. 4 is a cross-sectional view of the information input device 200 according to the second exemplary embodiment of the present disclosure.

Like numbers refer to like elements in the information input device 200 described in the first exemplary embodiment, and redundant descriptions thereof are omitted in the present exemplary embodiment.

With reference to FIGS. 3A and 3B, the information input device 200 according to the first exemplary embodiment includes the photointerrupters 208 disposed at the outermost location of the configuration.

The information input device 200 according to the first exemplary embodiment depends in size on the positions of the photointerrupters 208, and a line segment L1 in FIGS. 3A and 3B indicates the size.

Thus, the dispositions of the photointerrupters 208 further inside in the radial direction (in the X direction) of the rotary dial 202 than the positions of those illustrated in FIGS. 3A and 3B allows more miniaturization.

In the information input device 200 according to the present exemplary embodiment, the photointerrupters 208 are disposed under the movable switch 206 further inside than the outline of the movable switch 206 in the radial direction (in the X direction) of the rotary dial 202.

In addition, as illustrated in FIG. 4, the information input device 200 according to the present exemplary embodiment includes photo-reflectors 212, instead of the photointerrupters 208, to detect rotation of the rotary dial 202.

If the photointerrupters 208 are used, the light shielding plate 207 will be inserted into the inside of the photointerrupters 208 in the direction (in the X direction) orthogonal to the Z direction, in which the information input device 200 is assembled.

This makes it difficult to assemble the information input device 200 in one direction.

The information input device 200 according to the present exemplary embodiment has a rotation operation system 215 including the rotary dial 202, a support member 216, a pair of reflection members 213, a pair of photo-reflectors 212 mounted on a printed wiring board 217, and a base 219 as a holding unit.

In FIG. 4, the pair of photo-reflectors 212 is mounted on the printed wiring board 217 to detect a rotation direction, but the other photo-reflector 212 is not illustrated.

The photo-reflectors 212 are fixed to the base 219 with an adhesive via the printed wiring board 217 so that the direction of light emission from the photo-reflectors 212 is orthogonal to the axis O.

According to the present exemplary embodiment, the photo-reflectors 212 are disposed so that the direction of light emission from the photo-reflectors 212 is orthogonal to the axis O, but the direction may be parallel to the axis O.

The reflection members 213 each have a detection pattern (not illustrated) in which white and black are alternately painted in the circumferential direction and the reflection members 213 each are provided on the surface facing the corresponding photo-reflector of the photo-reflectors 212.

Further, each of the reflection members 213 is fixed to the corresponding back side of the support member 216 and integrally rotates with the rotary dial 202 and the support member 216.

As the rotary dial 202 rotates, a white part and a black part in the detection pattern (not illustrated) alternately faces the corresponding photo-reflector of the photo-reflectors 212.

The pair of photo-reflectors 212 detects switching of white and black in the detection pattern (not illustrated) to detect rotation of the rotary dial 202.

The base 219 is provided to dispose the photo-reflectors 212 inside the information input device 200, and each of the reflection members 213 is provided with a reflection surface to reflect the light emitted from each of the photo-reflectors 212.

The photo-reflectors 212 each are reflection type optical sensors, and viewed from the direction orthogonal to the rotation axis of the rotary dial 202, the photo-reflectors 212 are disposed inside the outline of the movable switch 206 as the tilt detection unit in the radial direction of the rotary dial 202.

Each of the photo-reflectors 212 is disposed on the base 219 so that the direction of detection by each of the photo-reflectors 212 is orthogonal to the rotation axis of the rotary dial 202.

The reflection members 213 each are disposed so that the reflection surface thereof faces the corresponding photo-reflector of the photo-reflectors 212.

According to the above-described configuration, the information input device 200 according to the present exemplary embodiment is smaller than that in the configuration of the first exemplary embodiment.

A third exemplary embodiment is described. A dust-proof configuration that is suitable for the information input device 200 in the configuration according to the first exemplary embodiment will be described with reference to FIGS. 5A and 5B.

(Dust-Proof Configuration Suitable for Information Input Device 200)

The information input device 200 performs both the rotation operation and the tilt operation in a miniaturized size in the configuration according to the first exemplary embodiment described with reference to FIGS. 1A and 1B to FIGS. 3A and 3B.

However, the information input device 200 is provided with the first sloping surface 202a, like a mortar shape, generating a concern that foreign matter such as dust and dirt is likely to enter from the outside of the information input device 200.

Dust and dirt can stay in between the rotary dial 202 and the drip-proof member 204 or the sliding member 205, causing worse operability and malfunction of the rotary dial 202.

Figure 5A:
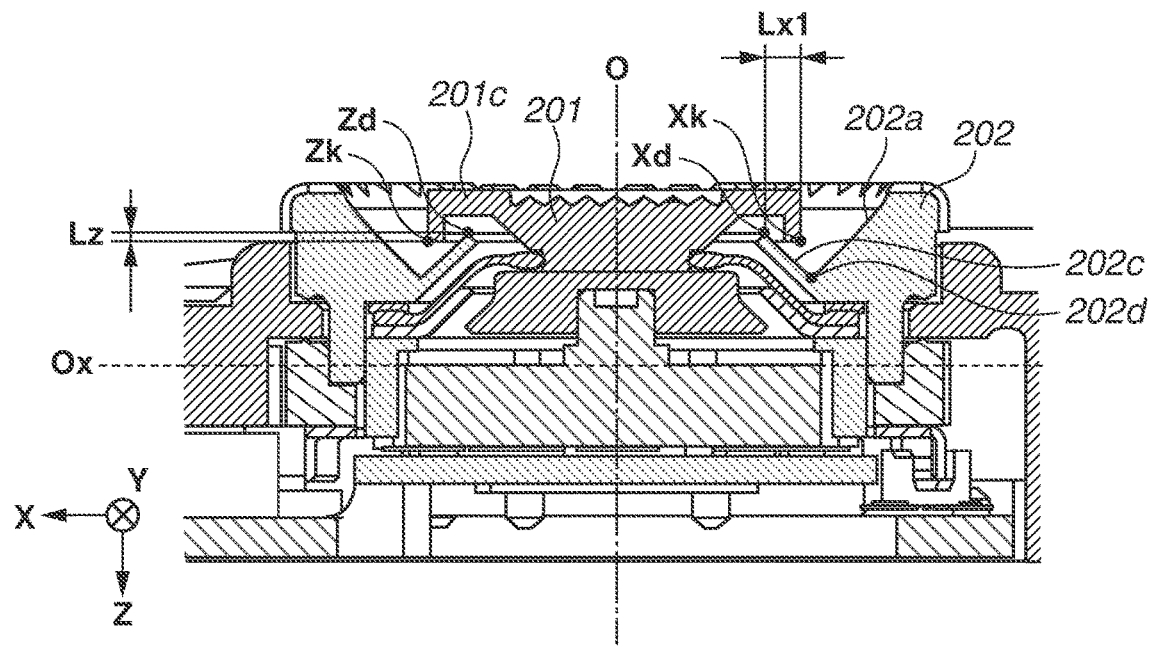
FIG. 5A is a cross-sectional view of an example of an operation member with a dust-proof configuration (a socket-and-spigot configuration).

FIG. 5A is a cross-sectional view of an example of an operation member in a dust-proof configuration (a socket-and-spigot configuration).

The keytop 201 includes a flange portion 201c, and a second sloping surface 202c of the rotary dial 202 forms a V-shape that is folded back (a folded portion 202d) with respect to the first sloping surface 202a.

The folded portion 202d in the rotary dial 202 can hold dust, if any, present on the first sloping surface 202a.

An outer end Xk corresponds to the X coordinate position of the outmost end of the keytop 201 centering the axis O, and an inner end Xd corresponds to the X coordinate position of the inner end of the rotary dial 202.

A lower end Zk corresponds to the Z coordinate position of the lower end of the flange portion 201c of the keytop 201 centering a reference line Ox orthogonal to the axis O, and an upper end Zd corresponds to the Z coordinate position of the upper end of the second sloping surface 202c of the rotary dial 202.

The flange portion 201c of the keytop 201 is formed partially over the second sloping surface 202c from the inner end Xd to the outer end Xk in the radial direction (in the X direction) (an overlapping amount Lx1).

The above-described configuration prevents dust and dirt in the Z direction from staying in between, preventing worse operability and malfunction of the rotary dial 202.

In addition, the flange portion 201c of the keytop 201 is formed partially over the second sloping surface 202c from the upper end Zd to the lower end Zk in the Z direction (an overlapping amount Lz).

The above-described configuration prevents dust and dirt from the radial direction (in the X direction) from staying in between, preventing worse operability and the malfunction of the rotary dial 202.

(Cross-Sectional View with Keytop Tilted)

Figure 5B:
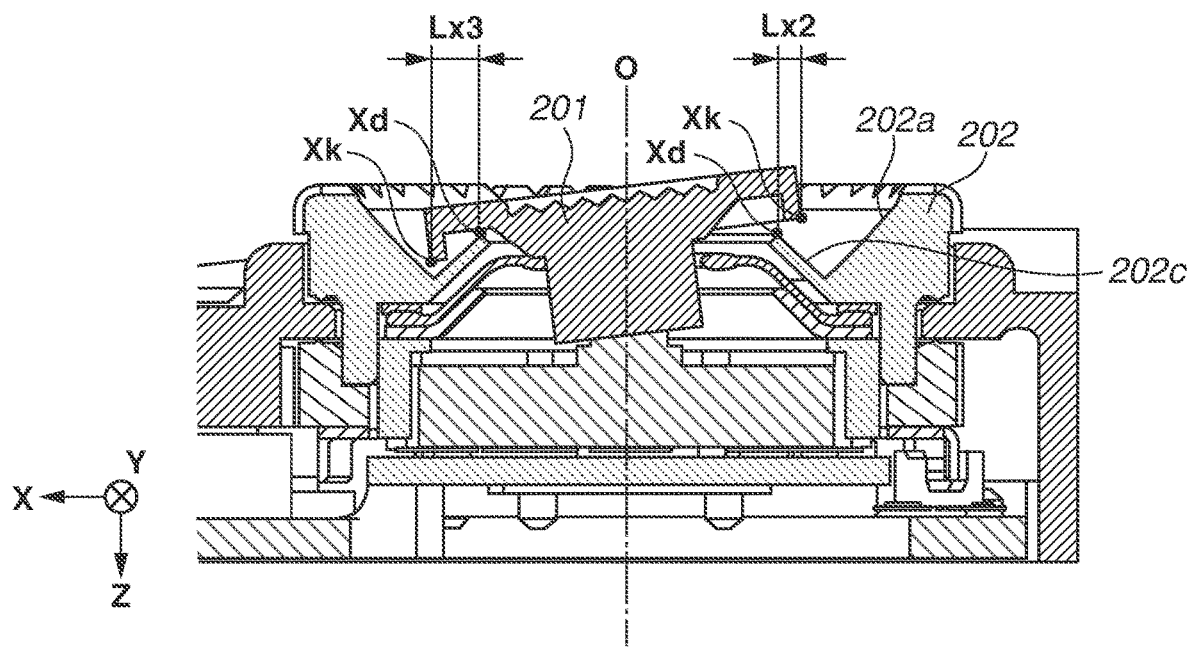
FIG. 5B is a cross-sectional view illustrating a case where a keytop in FIG. 5A is tilted.

FIG. 5B is a cross-sectional view with the keytop 201 of FIG. 5A tilted.

The flange portion 201c and the second sloping surface 202c are formed to satisfy Xk−ΔXk>Xd when a user performs a tilt operation on the keytop 201, where ΔXk is a variation of the outer end Xk in the tilt operation.

In other words, the configuration maintains the relationship (overlapping amounts Lx1 and Lz) of the flange portion 201c of the keytop 201 partially overlapping the second sloping surface 202c in the radial direction (in the X direction) from the inner end Xd to the outer end Xk.

According to the third exemplary embodiment, the flange portion 201c of the keytop 201 is formed not to come into contact with the first sloping surface 202a in order to prevent a flaw caused by the keytop 201 coming into contact with first sloping surface 202a of the rotary dial 202.

Viewed from the direction orthogonal to the rotation axis of the rotary dial 202, in the rotary dial 202, the second sloping surface 202c extends from the end of the first sloping surface 202a nearer the rotation detection unit, and approaches the rotation axis of the rotary dial 202, as the second sloping surface 202c grows more distant from the rotation detection unit in the rotation axis direction of the rotary dial 202.

Viewed from the direction orthogonal to the rotation axis of the rotary dial 202, the end of the second sloping surface 202c nearer the tilt operation surface 201b is located nearer the rotation axis than the outer edge of the keytop 201 in the radial direction.

In the rotation axis direction, the end of the second sloping surface 202c nearer the tilt operation surface 201b is lower than the end of the first sloping surface 202a nearer the rotation operation surface 202b and the tilt operation surface 201b of the keytop 201, and is higher than the end of the keytop 201 nearer the rotation detection unit.

Viewed from the direction orthogonal to the rotation axis of the rotary dial 202, the inner end of the second sloping surface 202c nearer the tilt operation surface 201b is located nearer the rotation axis than the end of the outer edge of the keytop 201 in the radial direction with the keytop 201 tilted.

The above-described configuration prevents dust and dirt from staying in between, preventing worse operability and the malfunction of the rotary dial 202.

A fourth exemplary embodiment is described. A configuration in which a dust-proof performance is further improved compared with the configuration according to the third exemplary embodiment is described below with reference to FIGS. 6A and 6B.

The dust-proof configuration in the radial direction (in the X direction) is similar to that according to the third exemplary embodiment, and thus redundant descriptions thereof are omitted.

(Cross-Sectional View of Example of Operation Member Including Dust-Proof Configuration (Configuration OF Pressing with Rubber)

Figure 6A:
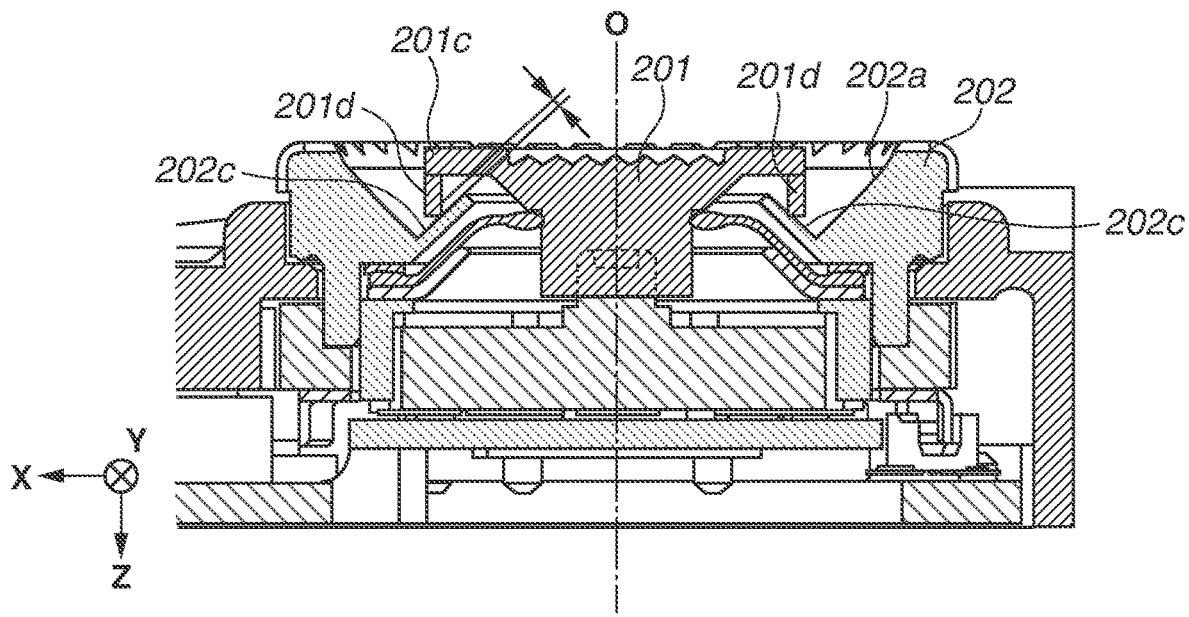
FIG. 6A is a cross-sectional view of an example of an operation member with a dust-proof configuration (a configuration of pressing with rubber).

FIG. 6A is a cross-sectional view of an example of an operation member with the dust-proof configuration (a configuration of pressing with rubber).

A rubber portion 201d as an elastic member is provided on the top of the flange portion 201c of the keytop 201.

In the configuration, the rubber portion 201d of the keytop 201 and the first sloping surface 202a of the rotary dial 202 are spaced a tiny gap apart in the Z direction small.

The tiny gap is a minimum at which the rotary dial 202 and the keytop 201 will not come into contact with each other.

The above-described configuration prevents dust and dirt from the radial direction (in the X direction) from staying in between, preventing worse operability and the malfunction of the rotary dial 202.

The tiny gap limits routes of entrance of dust and dirt beyond the level of the configuration described according to the third exemplary embodiment, providing a higher dust-proof performance.

The rubber portion 201d may be formed on the flange portion 201a through two-color molding or with a double-sided adhesive tape.

(Cross-Sectional View in a Case where Keytop is Tilted)

Figure 6B:
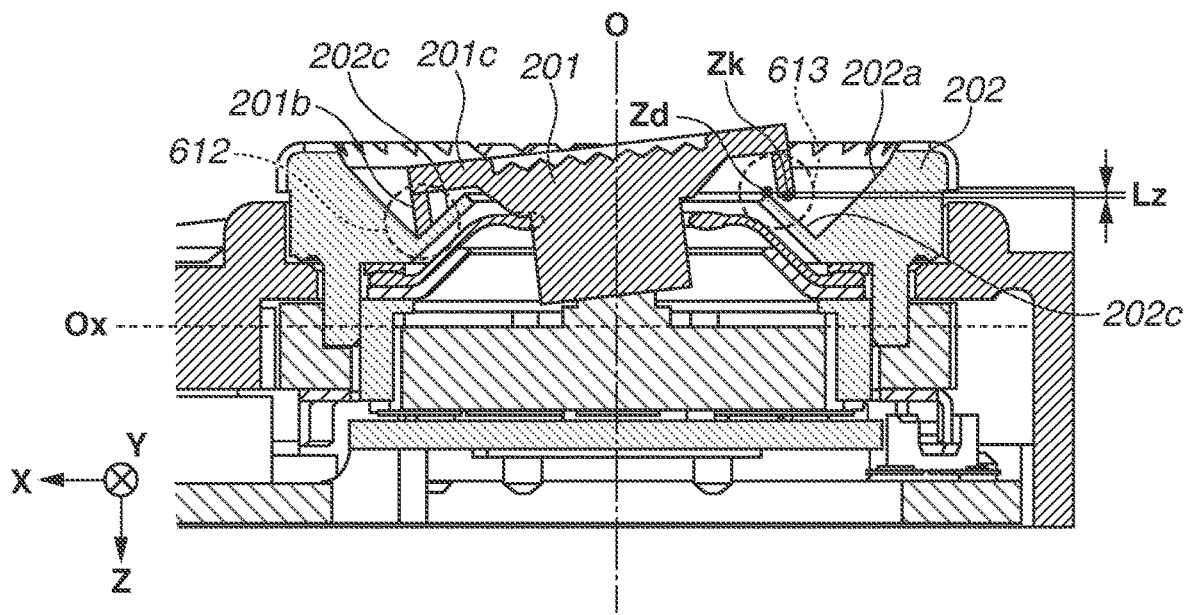
FIG. 6B is a cross-sectional view illustrating a case where a keytop in FIG. 6A is tilted.
Figure 7:
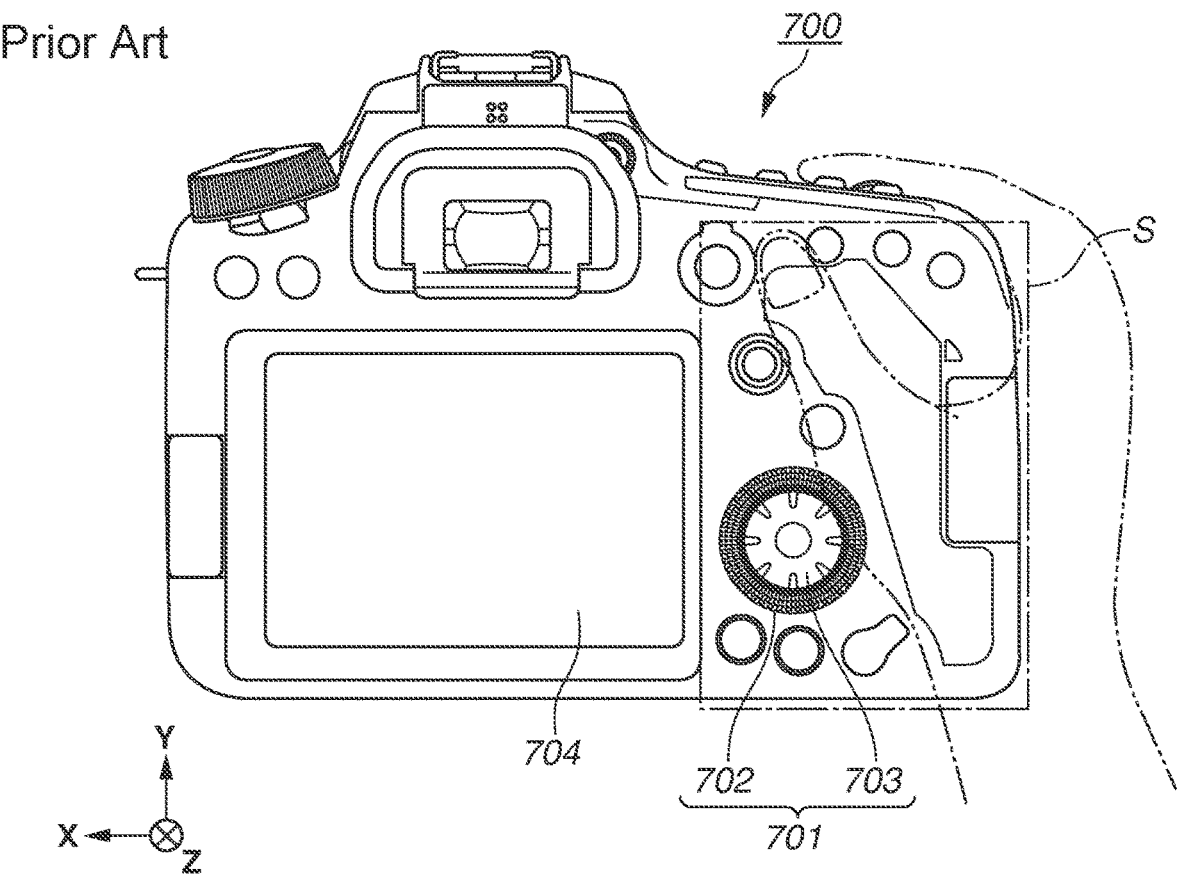
FIG. 7 is an external view of an electronic device provided with an information input device according to Japanese Patent Application Laid-Open No. 2013-251160.

FIG. 6B is a cross-sectional view illustrating a case where the keytop 201 in FIG. 6A is tilted.

With the keytop 201 tilted by a user, as illustrated in a detailed portion 612, the rubber portion 201d provided allows part of the rubber portion 201d to be compressed against the second sloping surface 202c in the Z direction, by the action of which a sealed structure is formed that prevents dust and dirt from staying in between.

The compressed part of the rubber portion 201d against the second sloping surface 202c does no damage to the rotary dial 202 due to the elastic member.

On the other hand, the rubber portion 201d is provided so that the second sloping surface 202c and the rubber portion 201*d* of the keytop 201 partially overlap with each other from the upper end Zd of the second sloping surface 202*c* to the lower end Zk of the rubber portion 201*d* in the Z direction (an overlapping amount Lz) in a portion 613, which both are spaced a gap apart and is not compressed.

The above-described configuration prevents dust and dirt from the radial direction (in the X direction) from staying in between.

When a user performs a tilt operation on the keytop 201, the above-described configuration also prevents dust and dirt from the radial direction (in the X direction) from staying in between without doing any damage to the rotary dial 202, preventing worse operability and the malfunction of the rotary dial 202.

The rubber portion 201*d* is provided that extends from the outer edge of the tilt operation surface 201*b* of the keytop 201 toward the rotation detection unit in the rotation axis direction.

The exemplary embodiment of the present disclosure is described in which the end of the rubber portion 201*d* nearer the rotation detection unit is spaced a gap apart from the second sloping surface 202*c* in the rotation axis direction with the keytop 201 not tilted. However, the present disclosure is not limited to the above-described exemplary embodiments. The scope of the following claims is to be accorded the broadest interpretation so as to encompass all modifications, equivalent structures, and functions.

(Modifications)

According to the first to the fourth exemplary embodiments, the information input device 200 is described in which the tilt operation surface 201*b* of the keytop 201 is disposed inside the annular shape of the rotation operation surface 202*b* of the rotary dial 202 as illustrated in FIG. 2.

The present disclosure is not limited to the embodiment illustrated in FIG. 2.

Disposed inside the rotation operation surface 202*b* in an annular shape, of the rotary dial 202, may be an optical tracking pointer as an operation unit.

The inside surface of the annular rotation operation surface of the rotation operation member may be an operation surface of the optical tracking pointer on which a user's finger is placed.

The optical tracking pointer (an example of optical input devices and is referred to as an "OTP" below) is a touch operation member that optically detects the movement of a pattern such as a fingerprint.

The OTP discussed in Japanese Patent Application Laid-Open No. 11-345076, Japanese Patent No. 4374049, and U.S. Pat. No. 6,552,713 is usable.

The OTP detects touch operation and objects (for example, a finger) that relatively move in two-dimensional directions and outputs movement information related to the movement of the finger or other objects. The OTP includes a light-emitting unit and an optical position detection element (which are not illustrated). The light-emitting unit emits light from the inside of an AF-ON button or a shutter button toward the finger placed on the operation surface of the AF-ON button or the shutter button.

Then, the optical position detection element measures reflected light from the pattern such as a fingerprint. The optical position detection element is, for example, an image sensor.

According to a modification, image processing discussed in Japanese Patent Application Laid-Open No. 11-345076 may be used to perform image tracking on the movement directions and the movement amounts of a finger and to generate signals indicating the movement of the finger as an example The movement information on the relatively moving finger that is an output of the OTP allows the range finding point frame displayed in a display that covers the field of view of the finder and the range finding point frame displayable on a display unit to be moved.

A display body displayable and movable in the display that covers the field of view of the finder or the display unit is not limited to the range finding point frame. For example, with the movement information from the OTP, a reproduced image may be switched to the next image to be reproduced.

The movement information may be used in the movement of a cursor to perform selection on the menu screen and in the switch of a setting value such as a shutter speed, ISO sensitivity, an aperture, and exposure correction of the camera.

An electronic device according to the present disclosure is not limited to a digital camera as an image capturing device. The electronic device may be a copy machine, a laser beam printer (LBP), and an ink jet printer.

Besides, the electronic device may be a small portable computer such as a smartphone, a tablet computer, and a smart watch.

In addition, the electronic device may be an automobile, a medical device, and a game machine.

As an example of medical device, a handy X-ray device that has a grip portion equipped with a tilt operation unit according to the present disclosure provides a fine adjustment of tilt operation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-019729, filed Feb. 7, 2020, which is hereby incorporated by reference herein in its entirety.

What is claimed is:

1. An information input device comprising:
    a rotation operation member configured to be rotatably operated, the rotation operation member being in an annular shape;
    an operation member having an operation surface in a plane orthogonal to a rotation axis of the rotation operation member;
    a detection unit configured to detect an operation on the operation member; and
    a rotation detection unit configured to detect a rotation operation around the rotation axis of the rotation operation member,
    wherein the operation member extends in a rotation axis direction of the rotation operation member,
    wherein the operation surface of the operation member is disposed inside an annular rotation operation surface of the rotation operation member,
    wherein, viewed from a direction orthogonal to the rotation axis of the rotation operation member, the rotation operation member includes a first sloping surface sloping with respect to the rotation axis of the rotation operation member and being on an annular inner circumference side of the rotation operation member, the first sloping surface being opposite to the operation member,
    wherein, viewed from the direction orthogonal to the rotation axis of the rotation operation member, the first sloping surface extends from the rotation axis of the rotation operation member, as the first sloping surface extends from the rotation detection unit in the rotation axis direction,
    wherein, viewed from the direction orthogonal to the rotation axis of the rotation operation member, the rotation operation member includes a second sloping surface extending from an end of the first sloping surface nearer the rotation detection unit and approaching the rotation axis of the rotation operation member as the second sloping surface extends from the rotation detection unit in the rotation axis direction,
    wherein, viewed from the direction orthogonal to the rotation axis of the rotation operation member, an inner end of the second sloping surface nearer the operation surface is located nearer the rotation axis than an outer edge of the operation member in a radial direction,
    wherein, viewed from the direction orthogonal to the rotation axis of the rotation operation member, the end of the second sloping surface nearer the operation surface is lower than an end of the first sloping surface nearer the operation surface and the operation surface of the operation member, and is higher than an end of the operation member nearer the rotation detection unit in the rotation axis direction,
    wherein, viewed from the direction orthogonal to the rotation axis of the rotation operation member, the end of the second sloping surface nearer the operation surface is spaced a gap apart from the operation member in the rotation axis direction with the operation member not in an operation,
    wherein, when viewed from the direction orthogonal to the rotation axis of the rotation operation member, an elastic member extends from an outer edge of the operation surface of the operation member toward the rotation operation member in the rotation axis direction,
    wherein, when viewed from the direction orthogonal to the rotation axis of the rotation operation member, in a state in which the operating member is not tilted, at an end of the elastic member on a rotation operation member side, there is a gap in the direction of the rotation axis with respect to the second sloping surface, and
    wherein, in a state in which the operation member is tilted, the end of the elastic member on the rotation operation member side comes into contact with and is compressed against the second sloping surface, and the inner end of the second sloping surface does not come into contact with an inner edge of the operation member.

2. The information input device according to claim 1, wherein the operation member is a tilt operation member tiltable in a plurality of directions in the plane orthogonal to the rotation axis of the rotation operation member, and the detection unit is a tilt detection unit configured to detect a tilt operation on the tilt operation member.

3. The information input device according to claim 2, wherein, viewed from the direction orthogonal to the rotation axis of the rotation operation member, the inner end of the second sloping surface is located nearer the rotation axis than an outer edge of the tilt operation member in the radial direction with the tilt operation member tilted.

4. The information input device according to claim 3,
    wherein, viewed from the direction orthogonal to the rotation axis of the rotation operation member, an elastic member is provided that extends from an outer edge of a tilt operation surface of the tilt operation member toward the rotation detection unit in the rotation axis direction, and
    wherein, an end of the elastic member nearer the rotation detection unit is spaced a gap apart from the second sloping surface in the rotation axis direction with the tilt operation member not in a tilt operation.

5. An image capturing device comprising:
    the information input device according to claim 1; and
    a control unit configured to perform control based on an operation input to the information input device.

6. An information input device comprising:
    a rotation operation member configured to be rotatably operated;
    an operation member having an operation surface in a plane orthogonal to a rotation axis of the rotation operation member;
    a detection unit configured to detect an operation on the operation member; and
    a rotation detection unit configured to detect a rotation operation around the rotation axis of the rotation operation member,
    wherein the operation member extends in a rotation axis direction of the rotation operation member,
    wherein the operation surface of the operation member is disposed inside a rotation operation surface of the rotation operation member,
    wherein, viewed from a direction orthogonal to the rotation axis of the rotation operation member, the rotation operation member includes a first sloping surface sloping with respect to the rotation axis of the rotation operation member and being on an inner circumference side of the rotation operation member, the first sloping surface being opposite to the operation member, wherein, viewed from the direction orthogonal to the rotation axis of the rotation operation member, the first sloping surface extends from the rotation axis of the rotation operation member, as the first sloping surface extends from the rotation detection unit in the rotation axis direction, wherein, viewed from the direction orthogonal to the rotation axis of the rotation operation member, the rotation operation member includes a second sloping surface extending from an end of the first sloping surface nearer the rotation detection unit and approaching the rotation axis of the rotation operation member as the second sloping surface extends from the rotation detection unit in the rotation axis direction, wherein, viewed from the direction orthogonal to the rotation axis of the rotation operation member, an inner end of the second sloping surface nearer the operation surface is located nearer the rotation axis than an outer edge of the operation member in a radial direction, wherein, viewed from the direction orthogonal to the rotation axis of the rotation operation member, the end of the second sloping surface nearer the operation surface is lower than the operation surface of the operation member, and is higher than an end of the operation member nearer the rotation detection unit in the rotation axis direction, and wherein, viewed from the direction orthogonal to the rotation axis of the rotation operation member, the end of the second sloping surface nearer the operation surface is spaced a gap apart from the operation member in the rotation axis direction with the operation member not in an operation, wherein, when viewed from the direction orthogonal to the rotation axis of the rotation operation member, an elastic member extends from an outer edge of the operation surface of the operation member toward the rotation operation member in the rotation axis direction, wherein, when viewed from the direction orthogonal to the rotation axis of the rotation operation member, in a state in which the operating member is not tilted, at an end of the elastic member on a rotation operation member side, there is a gap in the direction of the rotation axis with respect to the second sloping surface, and wherein, in a state in which the operation member is tilted, the end of the elastic member on the rotation operation member side comes into contact with and is compressed against the second sloping surface, and the inner end of the second sloping surface does not come into contact with an inner edge of the operation member.

* * * * *